United States Patent [19]

Wang et al.

[11] 4,210,531

[45] Jul. 1, 1980

[54] PROCESS FOR DEWATERING MINERAL CONCENTRATES

[75] Inventors: Samuel S. Wang, Cheshire; Morris E. Lewellyn, Stamford, both of Conn.

[73] Assignee: American Cyanamid Company, Stamford, Conn.

[21] Appl. No.: 860,912

[22] Filed: Dec. 15, 1977

[51] Int. Cl.$^2$ .................. B01D 21/01; C02B 1/20
[52] U.S. Cl. ................................ 210/51; 210/53; 210/54; 209/5
[58] Field of Search ............ 209/5; 210/42 R, 51–54, 210/59, 75; 252/180, 351, 353, 354, 60, 61, 194; 560/151

[56] References Cited

U.S. PATENT DOCUMENTS

| 2,028,091 | 1/1936 | Jaeger | 560/151 |
|---|---|---|---|
| 2,066,778 | 1/1937 | Herbsman | 210/54 |
| 2,176,423 | 10/1939 | Jaeger | 560/151 |
| 2,266,954 | 12/1941 | Bonnet | 210/54 |
| 2,864,765 | 12/1958 | Stoneman et al. | 210/54 |
| 2,975,123 | 3/1961 | Head | 210/54 |
| 3,314,537 | 4/1967 | Greene et al. | 209/5 |
| 3,418,237 | 12/1968 | Booth et al. | 209/5 |
| 4,097,390 | 6/1978 | Wang et al. | 252/60 |
| 4,107,028 | 8/1978 | Emmett, Jr. et al. | 210/54 |
| 4,146,473 | 3/1979 | Edelmann et al. | 210/54 |
| 4,156,649 | 5/1979 | Quinn et al. | 210/51 |

FOREIGN PATENT DOCUMENTS

| 491099 | 3/1953 | Canada | 560/151 |
|---|---|---|---|
| 2079698 | 11/1971 | France | 210/70 |

*Primary Examiner*—Charles N. Hart
*Assistant Examiner*—Peter A. Hruskoci
*Attorney, Agent, or Firm*—William J. vanLoo; Paul W. Leuzzi, II

[57] ABSTRACT

Treatment of a slurry of a mineral concentrate with a flocculant followed by a combination of an anionic surfactant and a water-insoluble organic liquid provides reduced moisture content upon dewatering the thus-treated slurry.

10 Claims, No Drawings

PROCESS FOR DEWATERING MINERAL CONCENTRATES

CROSS-REFERENCE TO RELATED APPLICATION

This application is related to application Ser. No. 860,913 filed on Dec. 15, 1977. The instant application relates to a process for dewatering a mineral concentration and the related application relates to a combination of anionic surfactant and a water-insoluble organic liquid.

The invention relates to a composition of matter useful as a dewatering aid in the processing of mineral concentrates. More particularly, this invention relates to such a composition comprising an anionic surface active agent and a water-insoluble organic liquid.

Valuable components of numerous mimerals are concentrated by various procedures to provide mineral concentrates that are further processed. One of the most widely used methods of concentration is froth flotation which is applicable to a wide variety of minerals including coal. After a mineral has been sufficiently enriched in valuable component by concentrating, it is usually subjected to dewatering as that it may be shipped more economically and/or further processed more readily. In dewatering, the mineral concentrate in slurry form is subjected to filtration or equivalent processing to remove water therefrom. The removal of water decreases the weight of the concentrate and in the case of coal increases the BTU value per unit weight of concentrate; the removal of water by dewatering also reduces the energy requirements for subsequent evaporation of residual water when necessary such as for smelting.

The commercial procedure for dewatering mineral concentrates generally involves some type of liquid water removal from the aqueous slurry arisng from prior concentration using some type of dewatering aid. A dewatering aid is a substance which when added in effective amounts to the concentrate slurry reduces the residual water content thereof below that obtained in the absence of additive. Surface active agent compositions have been found to be effective aids in the dewatering of mineral concentrates. Flocculants have also been found to be effective aids in Surface active agent compositions have been found to be effective aids in the dewatering of mineral concentrates. Flocculants have also been found to be effective aids in the dewatering of mineral concentrates. It was later found that the use of both a flocculant and a surface active agent composition led to advantages over the separate components at equal dosages.

In spite of the effectiveness of the processes involving dewatering aids or combinations thereof, there nevertheless exists the need for improved processes which provide still lower residual water in the filtered concentrate and result in advantages thereby. In the case of coal, for example, each one percent absolute reduction in water content could provide a two-cent per ton per mile reduction in freight shipping costs and an increase of about 10 cents per ton in BTU values. Considering annual processing of many millions of tons of coal, such advantages could provide substantial savings in shipping costs and significant increases in available BTU values. The provision for an improved process for dewatering mineral concentrates, therefore, would fulfill a long-felt need and constitute a significant advance in the art.

In accordance with the present invention, there is provided a process for dewatering mineral concentrates which comprises first mixing with an aqueous slurry of said mineral concentrate an effective amount of a flocculant; next mixing with the flocculant-treated slurry an effective amount of a combination of an anionic surface active agent composition and a water-insoluble organic liquid selected from aliphatic hydrocarbons, aromatic hydrocarbons, aliphatic alcohols, aromatic alcohols, aliphatic halides, aromatic halides, vegetable oils, and animal oils, said combination comprising from about 5 to about 95 weight percent of anionic surface active agent and, correspondingly, from about 95 to about 5 weight percent of water-insoluble organic liquid, based on the total weight of said surface active agent and said organic liquid, said water-insoluble organic liquid being different from any water-insoluble organic liquid present in said anionic surface active agent composition; and thereafter removing water as a liquid from said slurry.

The process of the present invention provides lower residual water contents after dewatering than can be obtained by former processes. This is highly surprising and quite unexpected in view of the fact that the water-insoluble organic liquid provides synergistic results.

In carrying out the process of the present invention, any mineral concentrate that is conventionally subjected to dewatering may be employed with advantage. Particularly effective are those mineral concentrates that are obtained in the form of aqueous slurries of finely ground ores. Concentrates of copper and iron as the sulfides and oxides, salt minerals, coal refuse, fine coal, and the like are preferred for processing according to the present invention.

The process of dewatering according to the present invention is such that water is removed in liquid form from a slurry of mineral concentrate in water. Thus, the term "dewatering", as that term is used herein and in the appended claims, means that water is removed per se, that is in liquid form, as opposed to vapor or solid form.

In carrying out the process of the present invention, an aqueous slurry of mineral concentrate is first treated with an effective amount of a flocculant in accordance with conventional procedures. Preferred flocculants are polyacrylamides which may be cationic, nonionic, or anionic in nature and have molecular weights in the range of about 500,000 to about 25,000,000, more preferably about 1,000,000 to 10,000,000. As is known, homopolymers of acrylamide are nonionic as are copolymers of acrylamide containing nonionic comonomers such as acrylonitrile, methyl methacrylate, vinyl acetate, vinyl ethers, styrene, and the like. Anionic polyacrylamides contain anionic groups arising from a content of acrylic or other mono-ethylenically unsaturated acids. Cationic polyacrylamides contain cationic groups arising from comonomer content or chemical modification of amide groups of polyacrylamide. Cationic comonomers include quaternary compounds such as trimethylammoniumethyl methacrylate methosulfate and diallyldimethylammonium chloride. Exemplary of chemical modifications of polyacrylamide include Mannich bases and quaternized Mannich bases. Other flocculants may be used as are conventionally employed and no new teachings are required since this step of processing is in conformity with conventional processing. The flocculant is used at an effective dosage and this is generally from about 0.001 to about 5.0 preferably about 0.01 to about 1.0 pounds per ton of mineral concentrate.

After the flocculant has been mixed with the concentrate slurry. There is next mixed with the flocculant-treated slurry and effective amount of a combination of an anionic surface active agent composition and a selected water-insoluble organic liquid. These agents may be added separately in any order or in admixture. The combination will comprise from about 5 to about 95 weight percent of the anionic surface active agent and, correspondingly, from about 95 to about 5 weight percent of the selected water-insoluble organic liquid, based on the total weight of surface active agent and organic liquid. The effective amount of the combination will generally correspond to the amount of surface active agent conventionally employed, the proportion of the water-insoluble organic liquid of combination of the present invention serving to replace a like proportion of the anionic surface active agent. conventional usage of the surface active agent is generally in the range of about 0.01 to 5.0, preferably 0.1 to 1.0 pound per ton of concentrate. In accordance with the process of the present invention, usage of the combination will generally be in the same range but since the combination provides synergistic results, lower amounts may be employed while still providing lower residual water contents in the dewatered concentrate.

The anionic surface active agent composition will be one that is conventionally employed. Generaly such composition will comprise an anionic surface active agent and a solvent therefore so that the composition represents a solution. Usually such solutions are in water or in mixtures of water and water-soluble alcohols. In instances where the surface active agent is a sulfosuccinate ester, the esterifying alcohol employed may be used in excess and small amounts of unreacted water-insoluble alcohol may remain in the surface active composition. Suitable anionic surface active agent compositions are those containing as active ingredient dialkylsulfosuccinates (a preferred species), petroleum sulfonates, fatty acid soaps, alkyl ether sulfonates, alkaryl sulfonates, alkyl phosphates, and the like.

The selected water-insoluble organic liquid, as indicated, is from the group consisting of aliphatic hydrocarbons, aromatic hydrocarbons, aliphatic alcohols, aromatic alcohols, aliphatic halides, aromatic halides, vegetable oils, and animal oils. Typical water-insoluble organic liquids are represented by toluene, xylene, fuel oil, kerosene, octane, 2-ethylhexanol, nonylphenol, octyl chloride, chlorobenzene, vegetable oils such as babassu, castor, chinese tallow, coconut, corn, cottonseed, grapeseed, hempseed, kapok, linseed, wild mustard, oiticica, olive, ouri-ouri, palm, palm kernel, peanut, perilla, poppyseed, Argentine rapeseed, rubberseed, safflower, sesame, soybean, sunflower, tall, teaseed, tung, and ucuhuba oils, and animal oils such as fish and livestock oils. The useful water-insoluble organic liquid will be of sufficiently low water-solubility to be present as a separate phase in the aqueous slurry of mineral concentrate at the dosage employed and will have suitable melting and boiling points so as to be liquid over the range of use temperatures, generally 0°–50° C. at atmospheric pressure. If a water-insoluble organic liquid is present in the surface active agent composition being used in combination with the added water-insoluble organic liquid, then the added water-insoluble organic liquid should be different from that present in the surface active agent composition.

The combination of anionic surface active agent composition and water-insoluble organic liquid will comprise from about 5 to about 95 weight percent of anionic surface active agent and, correspondingly, from about 95 to 5 weight percent of selected organic liquid, based on the total weight of anionic surface active agent and organic liquid. The optimum composition for use will vary widely depending upon the specific anionic surface active agent and organic liquid employed. In a preferred embodiment employing fuel oil, the weight percent of surface active agent will be from about 50 to about 90 weight percent and, correspondingly, the weight percent of fuel oil will be from about 50 to about 10 weight percent.

After the combination of anionic surface active agent composition and water-insoluble organic liquid has been mixed with the flocculant-treated slurry, the slurry is dewatered following conventional procedures to remove liquid water therefrom. In the examples which follow, dewatering was effected using a pressure filter operating with air. Alternative procedures include vacuum filtration, centrifugation, and the like.

The invention is more fully illustrated in the examples which follow wherein all parts and percentages are by weight unless otherwise specified. Although the process is illustrated in its preferred embodiment involving fine coal, it is to be understood that similar advantages result using other mineral concentrates. In carrying out the dewatering examples, an experimental procedure described below was employed. This procedure is found to correlate well with commercial procedures.

DEWATERING TEST PROCEDURE

The coal used was in the form of chunks of bituminous coal of 1–2 incehes diameter. This was crushed to −28 mesh and divided into 300-gram samples. Each sample was mixed with 450 milliliters of water and the resulting slurry was rolled overnight. Another 150 milliliters of water was added to each sample to give a 33% solids slurry for the tests. An air pressure filter operating at 10 pounds/inch$_2$ was used with sharkskin filter paper as the filtering medium. Each coal slurry was stirred to provide a homogeneous mixture. Flocculant was added as a 0.1% aqueous solution with 2 minutes of stirring following addition. The combination of surfactant and organic liquid was added one minute after addition of the flocculant and stirring was maintained for two minutes after the flocculant addition. Thus, no additional stirring was effected for the combination since its addition was accomplished within the stirring time associated with the flocculant. The treated slurry was quickly poured into the filter and pressure was applied. The air pressure was continued for 30 seconds after air had penetrated the cake indicated by air being emitted at the drain. Filtration for a slurry without flocculant was normally 65 seconds. With flocculant this time dropped to 5 seconds. After the 30 seconds of air pressure, the pressure was quickly released and the filter cake removed. The cake was immediately weighted and heated at 150° F. overnight in an oven. Upon cooling, the cake was weighed again and the percent moisture was calculated as follows:

$$\% \text{ moisture} = \frac{\text{wet weight} - \text{dry weight}}{\text{wet weight}}.$$

Controls are run through the same processing except that appropriate additives are omitted.

In order to show the unexpected results obtained with the combinations of surfactant and organic liquid, plots are made of the results of flocculant plus surfactant alone and of flocculant plus organic liquid alone. From the straight line plot expected values of moisture reduction are obtained. In the data given in the examples, the unexpected increase in moisture reduction is given as the percentage greater than the expected value.

The crushed coal sample used in the tests had the following analysis.

million was used at 0.1 pound per ton of concentrate. One run made using flocculant alone. The combination of surfactant and organic liquid employed involved varying amounts of sodium bis(2-ethylhexyl) sulfosuccinate and corn oil. The surfactant composition contained 70% of sodium bis(2-ethylhexyl)sulfosuccinate, 1.7% 2-ethylhexanol, and ethanol-water. A control run was made using flocculant plus surfactant alone and another control run was made using flocculant and corn oil alone. Results and test details are given in Table II which follows:

TABLE II

FINE COAL DEWATERING

| Run | Dewatering Aid Usage | | | Residual Moisture Content (%) | Moisture Reduction[1] (%) | Expected Reduction[2] (%) | Increase Over Expected (%) |
|---|---|---|---|---|---|---|---|
| | Flocculant (lbs/ton) | Surfactant (lbs/ton) | Corn Oil (lbs/ton) | | | | |
| 1 (Control) | — | — | — | 26.24 | — | — | — |
| 2 | 0.1 | — | — | 21.49 | 18.1 | — | — |
| 3 | 0.1 | 0.35 | — | 17.48 | 33.4 | — | — |
| 4 | 0.1 | 0.315 | 0.035 | 16.87 | 35.7 | 32.3 | 10.5 |
| 5 | 0.1 | 0.28 | 0.07 | 17.02 | 35.1 | 31.2 | 12.5 |
| 6 | 0.1 | 0.245 | 0.105 | 17.22 | 34.4 | 30.0 | 14.7 |
| 7 | 0.1 | 0.21 | 0.14 | 17.40 | 33.7 | 28.8 | 17.0 |
| 8 | 0.1 | 0.175 | 0.175 | 17.41 | 33.7 | 27.7 | 21.7 |
| 9 | 0.1 | 0.14 | 0.21 | 18.15 | 30.8 | 26.6 | 16.5 |
| 10 | 0.1 | 0.105 | 0.245 | 18.60 | 29.1 | 25.5 | 14.1 |
| 11 | 0.1 | 0.07 | 0.28 | 19.08 | 27.3 | 24.4 | 11.9 |
| 12 | 0.1 | 0.035 | 0.315 | 19.34 | 26.3 | 23.2 | 13.4 |
| 13 | 0.1 | — | 0.35 | 20.42 | 22.2 | — | — |

Notes:
[1] Based on control
[2] From plot of Runs 3 and 13.

TABLE I

COAL ANALYSIS

| Fraction (Mesh Size) | Fraction Weight (%) | Original Moisture (%) | Ash (%) | BTU Value[1] | Sulfur Content (%) |
|---|---|---|---|---|---|
| 28 × 100 | 72.3 | 0.95 | 7.01 | 13,989 | 0.69 |
| 100 × 200 | 12.9 | 0.75 | 7.08 | 13,933 | 0.74 |
| 200 × 325 | 4.6 | 0.68 | 7.69 | 13,748 | 0.76 |
| −325 | 10.2 | 0.67 | 16.60 | 12,275 | 0.90 |
| −28 | 100.0 | 0.88 | 7.71 | 13,795 | 0.72 |

[1] per pound of coal

These results show that residual moisture contents obtained with the combination of surfactant and organic liquid are unexpectedly better than can be expected based on the performance of the individual components. Best results for the specific combination appear to be in the range of about 90:10 to 50:50 weight percent surfactant:organic liquid, respectively.

EXAMPLE 2

The procedure of Example 1 was followed in every material detail except that the organic liquid was a hydrocarbon identified as No. 2 Fuel oil and dosages were increased. Results and test details are given in Table III which follows:

TABLE III

FINE COAL DEWATERING

| Run | Dewatering Aid Usage | | | Residual Moisture Content (%) | Moisture Reduction[1] (%) | Expected Reduction[2] (%) | Increase Over Expected (%) |
|---|---|---|---|---|---|---|---|
| | Flocculant (lbs/ton) | Surfactant lbs/ton) | Fuel Oil (lbs/ton) | | | | |
| 1 (Control) | — | — | — | 26.24 | — | — | — |
| 2 | 0.1 | — | — | 21.49 | 18.1 | — | — |
| 3 | 0.1 | 0.7 | — | 17.85 | 32.0 | — | — |
| 4 | 0.1 | 0.63 | 0.07 | 17.95 | 31.6 | 31.3 | 1.0 |
| 5 | 0.1 | 0.56 | 0.14 | 17.09 | 34.9 | 30.6 | 14.0 |
| 6 | 0.1 | 0.49 | 0.21 | 17.37 | 33.8 | 29.2 | 13.0 |
| 7 | 0.1 | 0.42 | 0.28 | 17.92 | 31.7 | 29.2 | 8.6 |
| 8 | 0.1 | 0.35 | 0.35 | 16.39 | 37.8 | 28.6 | 32.2 |
| 9 | 0.1 | 0.28 | 0.42 | 15.44 | 41.2 | 28.0 | 47.1 |
| 10 | 0.1 | 0.21 | 0.49 | 16.84 | 35.8 | 27.3 | 31.1 |
| 11 | 0.1 | 0.14 | 0.56 | 16.06 | 38.8 | 26.6 | 45.9 |
| 12 | 0.1 | 0.07 | 0.63 | 17.84 | 32.0 | 25.9 | 23.6 |
| 13 | 0.1 | — | 0.7 | 19.60 | 25.3 | — | — |

Notes: See TABLE II

EXAMPLE 1

Following the general procedure described, a series of runs were made. A blank run was made to show the result with no additive. In other runs, a nonionic polyacrylamide of molecular weight range 1 million to 10

These results again show the unexpected results obtained with the combination of surfactant and organic liquid. For the specific combination of surfactant and organic liquid, best results appear to be obtained within the range of about 10 to 50 weight percent of surfactant and, correspondingly, about 90 to 50 weight percent of organic liquid. These results compared to those given in Table II show unexpected differences in the specific combination of surfactants and organic liquids chosen.

EXAMPLE 3

The procedure of Example 2 was again followed in every material detail except that the flocculant was a copolymer of 65:35 weight percent acrylamide:acrylic acid, respectively, thus representing an anionic flocculant and had a molecular weight of about 15,000,000. The total dosage of the combination was 0.35 lbs./ton of concentrate. Results and test details are given in Table IV which follows.

TABLE IV

FINE COAL DEWATERING

| Run | Dewatering Aid Usage | | | Residual Moisture (%) | Moisture Reduction[1] (%) | Expected Reduction[2] (%) | Increase Over Expected (%) |
| --- | --- | --- | --- | --- | --- | --- | --- |
| | Flocculant (lbs/ton) | Surfactant (lbs/ton) | Fuel Oil (lbs/ton) | | | | |
| 1 (Control) | — | — | — | 26.63 | — | — | — |
| 2 | — | 0.35 | — | 23.82 | 10.17 | — | — |
| 3 | 0.03 | — | — | 20.92 | 21.4 | — | — |
| 4 | 0.03 | 0.35 | — | 17.71 | 33.5 | — | — |
| 5 | 0.03 | 0.315 | 0.035 | 17.53 | 34.20 | 31.6 | 8.2 |
| 6 | 0.03 | 0.28 | 0.07 | 16.66 | 37.4 | 29.8 | 25.5 |
| 7 | 0.03 | 0.245 | 0.105 | 18.36 | 31.1 | 28.0 | 11.1 |
| 8 | 0.03 | 0.21 | 0.14 | 17.94 | 32.6 | 26.2 | 24.4 |
| 9 | 0.03 | 0.175 | 0.175 | 19.94 | 25.1 | 24.4 | 2.9 |
| 10 | 0.03 | 0.14 | 0.21 | 19.04 | 28.5 | 22.6 | 26.1 |
| 11 | 0.03 | 0.105 | 0.245 | 21.45 | 19.5 | 20.9 | −6.3 |
| 12 | 0.03 | 0.07 | 0.28 | 19.91 | 25.2 | 18.8 | 34.0 |
| 13 | 0.03 | 0.035 | 0.315 | 21.95 | 17.6 | 17.0 | 3.5 |
| 14 | 0.03 | — | 0.35 | 22.57 | 15.2 | — | — |

Notes: [1]Based on control
[2]From plot of runs 4 and 14.

These results show that unexpected results are also obtained with an anionic flocculant.

EXAMPLE 4

The procedure of Example 1 was again followed in every material detail except that the surface active agent composition was 70% solium bis(tridecyl)sulfosuccinate and 30% water, the organic liquid was 2-ethylhexanol, and the flocculant was a copolymer of 95% acrylamide and 5% diallyldimethylammonium chloride of molecular weight 3-4 million. Results and test details are given in Table V which follows.

These results show that unexpected results are obtained using other anionic surface active agents in accordance with the process of the present invention.

We claim:
1. A process for dewatering mineral concentrates which consists essentially of first mixing with an aqueous slurry of said mineral concentrate an effective amount of a polyacrylamide flocculant; next mixing with the flocculant-treated slurry an effective amount of a combination of an anionic surface active agent composition and a water-insoluble organic liquid selected from aliphatic hydrocarbons, aromatic hydrocarbons, aliphatic alcohols, aromatic alcohols, aliphatic halides, aromatic halides, vegetable oils, and animal oils, said combination comprising from about 5 to about 95 weight percent of anionic surface active agent and, corresponsingly, from about 95 to about 5 weight percent of water-insoluble organic liquid, based on the total weight of surface active agent and organic liquid, said water-insoluble organic liquid being different from any water-insoluble organic liquid present in said anionic surface active agent composition; and thereafter removing water as a liquid from said slurry.

2. The process of claim 1 wherein said flocculant is a nonionic polyacrylamide.

3. The process of claim 1 wherein said anionic surface active agent composition consists of sodium bis(2-ethylhexyl)sulfosuccinate.

TABLE V

FINE COAL DEWATERING

| Run | Flocculant (lb/ton) | Surfactant (lb/ton | 2-ethylhexanol(lb/ton) | Residual Moisture (%) | Moisture Reduction[1] (%) | Expected Reduction[2] (%) | Increase Over Expected (%) |
| --- | --- | --- | --- | --- | --- | --- | --- |
| 1 | — | — | — | 26.63 | — | — | — |
| 2 | — | 0.35 | — | 25.75 | 3.3 | — | — |
| 3 | 0.3 | — | — | 20.06 | 24.7 | — | — |
| 4 | 0.3 | 0.35 | — | 20.12 | 24.4 | — | — |
| 5 | 0.3 | 0.315 | 0.035 | 19.78 | 25.7 | 24.2 | 6.6 |
| 6 | 0.3 | 0.28 | 0.07 | 18.59 | 30.2 | 23.8 | 26.9 |
| 7 | 0.3 | 0.245 | 0.105 | 18.58 | 30.2 | 23.6 | 27.3 |
| 8 | 0.3 | 0.21 | 0.14 | 21.07 | 20.9 | 23.4 | −10.7 |
| 9 | 0.3 | 0.175 | 0.175 | 19.41 | 27.1 | 23.2 | 16.8 |
| 10 | 0.3 | 0.14 | 0.21 | 19.84 | 25.5 | 23.0 | 10.9 |
| 11 | 0.3 | 0.105 | 0.245 | 20.49 | 23.1 | 22.8 | 1.3 |
| 12 | 0.3 | 0.07 | 0.28 | 22.03 | 17.3 | 22.6 | −23.4 |
| 13 | 0.3 | 0.035 | 0.315 | 20.40 | 23.4 | 22.4 | 4.5 |
| 14 | 0.3 | — | 0.35 | 20.80 | 21.9 | — | — |

Notes: See TABLE IV

4. The process of claim 1 wherein said water-insoluble organic liquid is a fuel oil.

5. The process of claim 1 wherein said mineral concentrate is fine coal.

6. The process of claim 1 wherein said mineral concentrate is fine coal and said flocculant is a nonionic polyacrylamide.

7. The process of claim 1 wherein said mineral concentrate is fine coal, said flocculant is a nonionic polyacrylamide and said surface active agent is sodium bis(2-ethylhexyl)sulfosuccinate.

8. The process of claim 1 wherein said mineral concentrate is fine coal, said flocculant is a nonionic polyacrylamide, said surface active agent is sodium bis(2-ethylhexyl)sulfosuccinate, and said water-insoluble organic liquid is a fuel oil.

9. The process of claim 1 wherein said mineral concentrate is fine coal, said flocculant is a nonionic polyacrylamide, said surface active agent is sodium bis(2-ethylhexyl)sulfosuccinate, and said water-insoluble organic liquid is a vegetable oil.

10. The process of claim 9 wherein said vegetable oil is corn oil.

* * * * *